US005493439A

United States Patent [19]

Engle

[11] Patent Number: 5,493,439
[45] Date of Patent: Feb. 20, 1996

[54] ENHANCED SURFACE DEFORMATION LIGHT MODULATOR

[76] Inventor: Craig D. Engle, 336 Cline Ave., Griffith, Ind. 46319

[21] Appl. No.: 953,118

[22] Filed: Sep. 29, 1992

[51] Int. Cl.$^6$ ..................................................... G02F 1/29
[52] U.S. Cl. ........................................ 359/292; 359/295
[58] Field of Search .................................. 359/292, 295, 359/279 US; 358/62, 233

[56] References Cited

U.S. PATENT DOCUMENTS 2,681,423  6/1954  Auphan ........................................ 315/3

(List continued on next page.)

OTHER PUBLICATIONS

J. A. van Raalte, Television A New Schlieren Light Value for Television Projection, Applied Optics Oct. 1970 vol. 9, No. 10.

Peter B. Rolsma et al, Experimental parameters of the photoemitter membrane Spatial Light Modulator, Applied Optics, vol. 28, No. 22, 15 Nov. 1989.

Arthur D. Fisher et al, Photoemitter Membrane Light Modulator, Optical Engineering Feb. 1986, vol. 25, No. 2.

L. E. Sommers, The Photoemitter–Membrane Light Modulator Image Transducer, Adv. Electron. Phys. 33A, 493–510.

Kendall Preston, Jr. The Membrane Light Modulator and It's Application in Optical Computers, Optica Acta, 1969, vol. 16, No. 5.

T. P. Brody, A 6×6–in 20–lpi Electroluminescent Display Panel, IEEE Transactions on Electron Devices, vol. ED–22, No. 9, Sep. 1975.

K. Hess et al, Deformable Surface Spatial Light Modulator, Optical Engineering May 1987, vol. 26, No. 5.

Eugene T. Kozol et al, Dielectric Membrane Light Value Study, Technical Report RADC–TR–71, Mar. 1971, pp. 1/2, 3, 4.

Robert E. Brooke, Micromechanical Light Modulators on Silicon, Optical Engineering, Jan./Feb. 1985, vol. 24, No. 1.

L. S. Cosentino and W. C., Stewart, A Membrane Page Composer, RCA Review, vol. 31, Mar. 1973.

Kenzo Matada et al, LED Array Modules by New Technology Microbump Bonding Method, IEEE Transactions on Components, Hybrids, and Manufacturing Technology, vol. 13, No. 3, Sep. 1990.

John M. Doyle, Thin–Film and Semiconductor Integrated Circuitry, McGraw–Hill, pp. 20–21.

P. G. Lecomber, Present and Future Applications of Amorphous Silicon and It's Alloys, Journal of Non–Crystalline Solids, 115 (1989) 1–13.

"Integrated Circuits" in Encyclopedia of Semiconductor Technology (1984), pp. 369–371, Ref.TK7871.85, 1984.

*Primary Examiner*—F. Daniel Lopez
*Attorney, Agent, or Firm*—Wood, Phillips, VanSanten, Clark & Mortimer

[57] ABSTRACT

A surface deformation light modulator contains a plurality of first electrodes arranged in a matrix of p rows and q columns affixed to a substrate by a suitable means. Each electrode is electrically connected to a third terminal of a respective switching element. Each switching element is affixed to a second face of the substrate. Each column of electrodes is overlapped by a respective flexible, reflective conductor. Each conductor is affixed by a suitable means to a first face of the substrate. Having the switch matrix and the conductors affixed to opposite face of the substrate allows several processing options to be considered to reduce the influence of contamination and hence enhancing the commercial viability of the modulator. Each switch element further includes a first switch terminal and a second switch terminal. Every second terminal in each row is electrically connected by a respective second buss. A plurality of first busses electrically connects every first terminal in each row to a common potential source. Every first buss is parallel to each second buss to avoid electrical crossover networks to enhance reliability. A suitable potential control means allows control of the potential difference between each first electrode and the respective conductor thereby enabling a wavefront incident on the modulator to be phase modulated in accordance with an information bearing signal.

5 Claims, 2 Drawing Sheets

U.S. PATENT DOCUMENTS

| | | | |
|---|---|---|---|
| 2,910,532 | 10/1959 | Auphan | 178/7.5 |
| 3,463,572 | 8/1969 | Preston, Jr. | 350/161 |
| 3,479,109 | 11/1969 | Preston | 350/161 |
| 3,626,084 | 12/1970 | Whol | 178/7.5 D |
| 3,701,586 | 10/1972 | Goetz | 350/161 |
| 3,746,785 | 7/1973 | Goodrich | 178/7.5 D |
| 3,796,480 | 3/1974 | Preston et al. | 350/161 |
| 3,798,620 | 3/1974 | Cosentino | 340/173 LT |
| 3,879,630 | 4/1975 | Halperin et al. | 313/394 |
| 4,001,635 | 1/1977 | d'Auria | 315/169 R |
| 4,087,810 | 5/1978 | Hung et al. | 340/324 |
| 4,441,791 | 4/1984 | Hornbeck | 350/360 |
| 4,694,287 | 9/1987 | Chenevas-Paule et al. | 340/719 |
| 4,710,732 | 12/1987 | Hornbeck | 332/7.51 |
| 4,731,610 | 3/1988 | Baron et al. | 340/784 |
| 4,956,619 | 9/1990 | Hornbeck | 330/4.3 |

ENHANCED SURFACE DEFORMATION LIGHT MODULATOR

BACKGROUND

1. Field of the Invention

This invention relates to active matrix addressing and methods of construction for surface deformation type spatial light modulators.

2. Prior Art

Surface deformation type wavefront modulators defines a broad class of devices, including membrane light modulators. Previous membrane light modulators have been hindered by not having a reliable, cost effective, high speed, active matrix addressing scheme.

Several membrane modulators have been electron beam addressed. Examples include the device described in the article "Television: A New Schlieren Light Value for Television Projection" by J. A. van Raalte, Applied Optics, October 1970, Vol. 0, NO. 10. This configuration suffers from a poor luminous efficiency. No charge storage exists, and charge decay is utilized to erase an image. As identified in the article, dirt and/or dust contamination of the membrane is a problem that needs to be addressed. Further complications associated with electron beam addressing include packaging, high voltage requirements, and a vacuum environment. Similar limitations exist in U.S. Pat. No. 2,910,532 to M. Auphan, Oct. 27, 1959, and U.S. Pat. No. 2,681,423, to M. Auphan, Jun. 15, 1954. Auphan identifies several different reflective deformable conductive embodiments in U.S. Pat. No. 2,681,244. U.S. Pat. No. 2,681,244 suffers from several complications including electron beam addressing and reduced luminous efficiency due to the resistivity of the insulating substrate serving as a discharge mechanism for the capacitive membrane elements. Although several different embodiments are common to U.S. Pat. No. 2,681,244, as to be shown herein, the embodiments of U.S. Pat. No. 2,681,244 are not equivalent.

As identified in U.S. Pat. No. 2,681,423, one of the objectives was to present a light reflecting screen consisting of strips which are not insulated from one another. As to be shown herein, such an electrical arrangement between column electrodes restricts the latitude available in configuring an active matrix array of thin film transistors. As to be shown herein, this aspect has not been previously appreciated by those knowledgeable in the state of the art. Furthermore, my invention teaches away from prior art.

Additional electron beam addressed membrane light modulators include U.S. Pat. No. 3,701,586, to G. G. Goetz, Oct. 31, 1972, U.S. Pat. No. 3,746,785 to Goodrich, Jul. 17, 1973, and the configurations described in the articles "Experimental Parameters of the Photoemitter Membrane Spatial Light Modulator", by Peter B. Rolsma et al, Applied Optics/Vol. 28, No. 22/15 November 1989, "Photoemitter Membrane Light Modulator" by Arthur D. Fisher et al, Optical Engineering/February 1986/Vol. 25 No. 2, and "The Photoemitter-Membrane Light Modulator Image Transducer" by L. E. Sommers, Advances in Electronics and Electron Physics, Vol. 33A, 1972. Complications of a vacuum environment and impact on the membrane are provided in the cited references.

Additional membrane light modulator configurations exist and include optically addressed membrane light modulators such as U.S. Pat. No. 3,463,572 to K. Preston, Jr. Nov. 18, 1969. As well understood by those knowledgeable in the state of the art, optical addressing of light values employed in electronic to optical data conversion applications, such as HDTV and Infrared scene projection, could adversely effect signal fidelity due to unnecessary signal transformations required to optically address such a device. Accordingly, U.S. Pat. No. 3,463,572 is deemed undesirable for use in electronic to optical data conversion applications.

A "passive", coincidence matrix addressing schemes is employed in U.S. Pat. No. 4,001,635 to d'Auria et al, Jan. 4, 1977. Several of the problems associated with passive matrix schemes can be found in the article "A 6×6-in 20-lpi Electroluminescent Display Panel" by T. P. Brody et al, IEEE Transactions on Electron Devices, Vol. ED- 22, No. 9, September 1975. Furthermore, coincident matrix addressing hinders high frame rate capability due to each pixel being individually addressed.

U.S. Pat. No. 4,694,287 to Chenevas-Paule et al, Sep. 15, 1987, describes an active matrix addressing scheme for use with liquid crystal media. In U.S. Pat. No. 4,694,387 column addressing electrodes are affixed to "walls" of the device. Utilizing transmissive column electrodes affixed to "walls" of the device precludes any consideration for U.S. Pat. No. 4,694,287 to function as a membrane light modulator. If it is contemplated to utilize the electrode structure of U.S. Pat. No. 4,694,287 in a membrane light modulator configuration, additional components must be added. Additional components required so that U.S. Pat. No. 4,694,287 could be configured to function as a membrane light modulator would include reflective deformable conductors. Several surface deformation type modulators have utilized conductors affixed to "walls" to establish a potential difference across the deformable media. Examples include U.S. Pat. No. 3,626,084 to Whol, Dec. 7, 1971 and the device described in the article "Deformable Surface Spatial Light Modulator" by K. Hess et al, Optical Engineering/May 1987/Vol. 26, No. 5. Quoting from the article, "The gel elastomer (3) is placed between a transparent electrode (2) and a comb-shaped electrode (7). The application of a supply voltage (typically 200 to 300 V rms) between the two electrodes produces a nonuniform electric field, which deforms the dielectric elastomer and results in a gratinglike deformation of the free gel surface nearest the air gap (4)." This emphasizes that for surface deformation type modulators, a gap will exist between conductors affixed to the "walls", and the deformable media. "Walls" utilized to support conductors for use with deformable media could be viewed as extraneous components, hindering performance in several respects. Deformation type modulators utilizing conductors affixed to "walls" suffer from capactive voltage division across the gap between the deformable media and the conductors affixed to the "wall". As to be shown herein, gaps in membrane modulators could be eliminated. Gaps reduce modulation efficiency, since higher voltages must be utilized to establish a required deformation when compared to the case of no gap. This could adversely effect the geometry of switches utilized in an active matrix, since each switching element must handle a correspondingly higher voltage. This could adversely effect spatial resolution. Accordingly, U.S. Pat. No. 4,694,287 is undesirable for use with surface deformation type spatial light modulators. It should be noted, later configurations of the Deforgraphic Storage Display Tube employed a conductive electrode affixed to the deformable medium; see for instance U.S. Pat. No. 3,879,630 to Halperin et al, Apr. 22, 1975, and Technical Report RADC-TR-71, "Dielectric Membrane Light Value Study". Presumably, these later configurations evolved from the realization that elimination of the gap would enhance efficiency.

In addition to the reduced modulation efficiency attributed to capacitive voltage division, if reflective deformable conductors are added to U.S. Pat. No. 4,694,287 so the electrode configuration of U.S. Pat. No. 4,694,287 could be utilized in a membrane light modulator configuration, additional inefficiencies would exist. This is attributed to the face that each electrode labeled as "E" in U.S. Pat. No. 4,694,287 and a respective transistor are affixed to the same surface of a substrate. This prevents the electrodes "E" from conveniently overlapping a respective transistor. Consequently, the percentage of area that an electrode "E" occupies of an electrode "E" and respective transistor combination will be less than if each electrode "E" could overlap a respective transistor, ie the percentage of area that an electrode occupies of the image point area is reduced when compared to a case where the electrode can overlap a transistor.

As identified in the article "A Membrane Page Composer" by L. S. Cosentino and W. C. Stewart, RCA review Vol. 34, March 1973, reducing the percentage of the spatial period occupied by an electrode could reduce the modulation efficiency of the membrane light modulator.

As to be identified herein, my invention could utilize both major opposing surfaces of a substrate to allow each electrode to overlap a respective transistor thereby enhancing the modulator efficiency while eliminating extraneous components, such as a second substrate, when compared to prior art.

As to be inferred from the evolution of the Deforgraphic Storage Display Tube, considerations to enhance modulator efficiency are not obvious.

Since U.S. Pat. No. 4,694,287 would require additional components to function as a membrane light modulator and addition of such components yields a configuration that suffers from several complications, U.S. Pat. No. 4,694,287 is deemed unsuitable for use as a membrane light modulator.

U.S. Pat. No. 4,441,791 to Hornbeck, Apr. 10, 1984 describes a deformable mirror device disposed over a semiconductor substrate. Configurations of this nature are complicated. This statement is substantiated by the comments made in the article "Micromechanical Light Modulators on Silicon" by Robert E. Brooks, Optical Engineering, January February 1985, Vol. 24, No. 1. As quoted from the article, "These devices are not simple to make and require fabrication steps that are not completely compatible with integrated circuit (IC) processing methods."

In addition, the fabrication approach taken in U.S. Pat. No. 4,441,791 hinders achieving performance capabilities inherent in membrane elements. Speed of response is an important consideration for several applications, including infrared scene projection. Frame rates as high as a 1000 HZ are desired. Selection of a particular semiconductor substrate could limit alternatives available for interface components. CCD implementations in silicon have performance limitations when compared to GaAs Schottky barrier gate shift registers. Speed limitations of U.S. Pat. No. 4,441,791 are evident by the circuit configurations integrated with the device. For instance, to increase the data transfer rate, it is suggested to split the shift registers. This approach complicates construction and falls far short of the performance capabilities of alternatives. U.S. Pat. No. 4,441,791 utilizes electrical busses fabricated in a doped semiconductor and this could adversely effect speed of response of interface circuitry. Furthermore, use of a semiconductor substrate could limit the dimensions available for a modulator array. This could hinder implementation of large format devices, and/or the use of hybrid interface circuits to enhance performance capabilities, such as high speed shift registers.

As previously cited, contamination problems could render a membrane device ineffective. Having a membrane light modulator constructed as a monolithic device could adversely effect profits associated with a device exhibiting a poor yield. Construction of a device should allow for testing at an early stage of fabrication, involving reduced circuit complexities, to identify array problems prior to full scale system integration. This procedure would reduce the impact of poor yield. Such procedures are difficult to implement with devices constructed similar to U.S. Pat. No. 4,441,791. In addition, the complexity of the support grid in U.S. Pat. No. 4,441,791 hinders cleaning operations prior to affixing the membrane to it's support structure. Contamination and it's complications has hindered significant commercialization of this device. See for instance the comments concerning susceptibility to defects of membrane light modulators in U.S. Pat. No. 4,956,619 to Hornbeck, Sep. 11, 1990 and U.S. Pat. No. 4,710,732, to Hornbeck, Dec. 1, 1987. The fabrication sequence of U.S. Pat. No. 4,441,791 exposes the entire integrated system to contamination problems associated with the membrane. This risk is undesirable and as to be shown herein, unnecessary. In addition, by utilizing front side interface electronics, the substrate cannot serve to shield light sensitive components in this device. Poor utilization of system resources requires extraneous components to perform this function, increasing device investment prior to performance evaluations, and complicating device structure.

An alternative construction for a membrane modulator is described in U.S. Pat. No. 3,798,620 to Cosentino, Mar. 19, 1974. In this patent, crossovers are incorporated into the discrete transistor modules which are bonded to the backside of the device. As to be show herein, by suitable utilization of the membrane, requirements for crossovers in the switching array can be eliminated, not just translated as a requirement for another interface component. In addition, bonding several transistors to the substrate prior to membrane checkout is undesirable; the number of fabrication operations should be reduced prior to membrane checkout.

In addition, transferring the electrical crossover requirement to the semiconductor interface component hinders integration of alternative switching elements since the semiconductor interface component must have a packaging configuration which can accommodate the electrical crossover conductor. As to be shown herein, my invention utilizes column conductors to eliminate the electrical crossovers networks in the semiconductor interfaces. Since my invention eliminate electrical crossover networks, semiconductor packaging requirements to accommodate electrical crossovers are extraneous requirements. As to be shown herein, eliminating extraneous packaging requirements could facilitate integration of thin film transistors with membrane light modulators.

As previously stated, the different deformable conductor embodiments of U.S. Pat. No. 2,681,423 are not equivalent. This may be demonstrated by substituting a transmissive, non deformable, monolithic electrode for the transmissive, non deformable, column electrodes in U.S. Pat. No. 4,697,284. As well understood by those knowledgeable in the state of the art, if a monolithic electrode were substituted for the column electrodes in U.S. Pat. No. 2,697,284, then a consistent mode of operation would not be maintained thereby demonstrating that the embodiments of U.S. Pat. No. 2,681,423 are not equivalent. Although the monolithic electrode and the column electrode are not deformable in the example involving U.S. Pat. No. 4,697,384, the example does serve to illustrate that monolithic and column electrode structures are, in general, not equivalent.

Since the embodiments of U.S. Pat. No. 2,681,423 to Auphan were known at the time of U.S. Pat. No. 3,798,620 to Cosentino, evidently the benefits provided by my invention were not previously appreciated by those knowledgeable in the state of the art.

As can readily be seen, several membrane light modulators configurations have evolved. However, no device has achieved significant commercialization status. This could be attributed to the complications identified in the prior art.

OBJECTS AND ADVANTAGES

Accordingly, several objects and advantages of my invention include:

1) To introduce a new active matrix addressing configuration for use with membrane light modulators.

2) to show how the active matrix addressing configuration of my invention could enhance device reliability, luminous efficiency, modulation efficiency, is applicable to two dimensional spatial light modulators and is compatible with high frame rates and large format devices.

3) to show how my invention could enhance the cost effectiveness of manufacturing membrane light modulators arrays by allowing for device testing at an early stage of fabrication and provides a configuration amendable to cleaning operations prior to affixing a membrane, so as to reduce the influence of contamination.

4) to show how the substrate selection of my invention introduces fabrication options which could result in enhancing several performance characteristics of membrane light modulators.

5) to introduce a membrane light modulator configuration which employs backside electronic addressing components and to show how my invention posses characteristics which could enhance it's commercial viability.

Additional objects and advantages of my invention will become apparent from a consideration of the ensuing description and drawings.

DRAWING FIGURES

In the drawings, closely related figures have the same number but different alphabetic suffixes.

FIG. 1 shows a perspective view of a membrane light modulator.

FIG. 2 shows an active switching matrix affixed to the second face of the insulating substrate of my invention.

FIG. 3 shows a packaging option which could be employed with my invention.

FIG. 4 shows a block diagram of a suitable potential control means which could be utilized with my invention.

Figure 1:
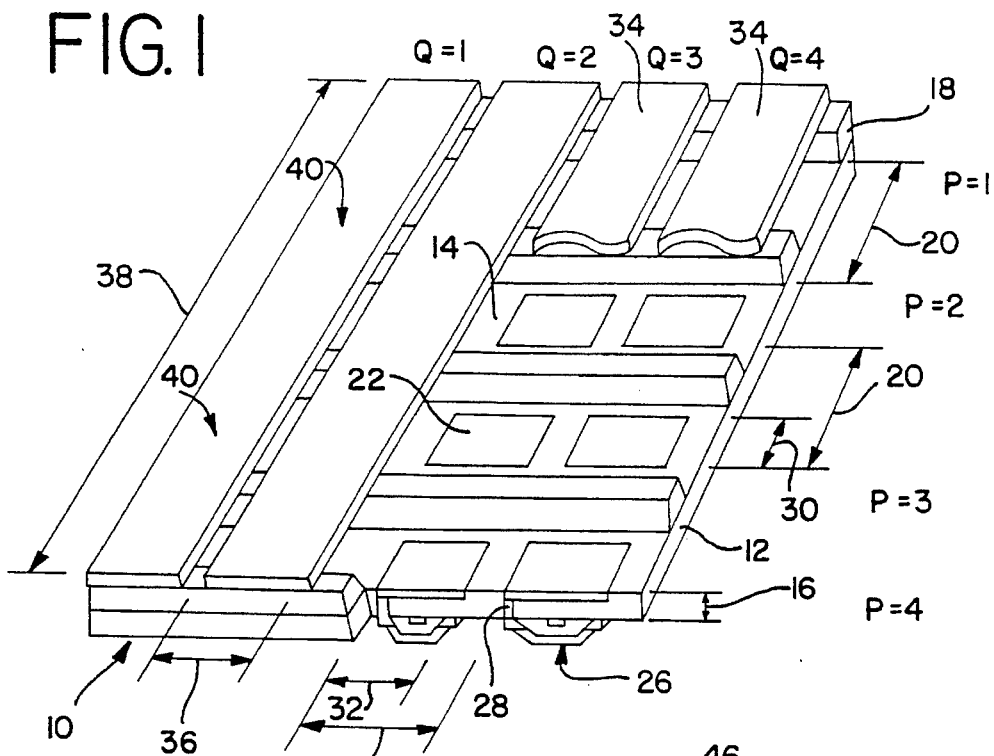
FIG. 1 shows an enhanced membrane light modulator array 10. Array 10 contains a substrate 12. Substrate 12 contains a first major face 14. Substrate 12 further includes a second major face. The second major face is not visible in this figure. Major face 14 and the second major face are essentially parallel and are separated by a substrate thickness 16. Face 14 further includes a plurality of ridges 18. Adjacent ridges 18 are separated by a first displacement period 20. Period 20 is perpendicular to thickness 16. Substrate 12 further includes a plurality of first electrodes 22. Electrodes 22 are arranged in a matrix containing p rows and q columns.

Each electrode 22 is affixed to substrate 12 by a suitable means. In this figure, electrodes 22 are affixed on face 14 by a suitable means. Such a suitable means could be vacuum deposition. As to be shown herein, alternatives exist to affix electrodes 22 to substrate 12. Each electrode 22 is identified by associating row and column values with the double subscript notation of p and q. Adjacent electrodes 22 in each row p are displaced by a second displacement period 24. Period 24 is perpendicular to thickness 16 and period 20. Adjacent electrodes 22 in each column q are displaced by first displacement period 20. Each electrode 22 is electrically connected to a respective switching element 26 by a feedthrough 28. As identified in the references provided herein, electrodes 22 could have a variety of geometries, including rectangular, or circular shapes. Each electrode 22 posses a first characteristic dimension 30. Dimension 30 is parallel to period 20. Dimension 30 is less than period 20 to allow for electrical isolation of adjacent electrodes 22. Each electrode 22 possess a second characteristic dimension 32. Dimension 32 is parallel to period 24. Dimension 32 is less than period 24 to allow for electrical isolation between adjacent electrodes 22. Array 10 further includes a plurality of flexible (deformable), reflective column conductors 34. Adjacent conductors 34 are displaced by a second period 24. Some conductors 34, ridges 18, and portions of substrate 12 are show cut away so as to expose array 10 for clarity. Each column conductor 34 poses a column conductor width 36. Width 36 is parallel to period 24. Width 36 is less than period 24 to allow for electrical isolation between adjacent conductors 34. Each column conductor 34 posses a column length dimension 38. Length dimension 38 is parallel to period 20. Conductors 34 are affixed to ridges 18 by a suitable means. Column conductors 34 are located relative to electrodes 22 so each column q of electrodes 22 is overlapped by a respective column conductor 34. Dimension 38 spans the respective column q of electrodes 22. Each electrode 22, in conjunction with the respective column conductor 34, forms a membrane capacitive pixel element 40. As to be described herein, a suitable potential control means is provided to control the potential difference of each element 40. This potential difference causes localized deformations of the column conductor 34 in a vicinity associated with the respective electrode 22. Relationships involving these localized deformations are well understood by those knowledgeable in the state of the art. A suitable means to control the potential difference at each element 40 allows a two dimensional wavefront incident on array 10 to be phase modulated in accordance with an information bearing signal. Incident wavefront, information bearing signal and suitable means to control the potential difference are not shown in this figure. As well understood by those knowledgeable in the state of the art, phase modulations could be converted to irradiance variations by the utilization of a schlieren optical system.

Figure 2:
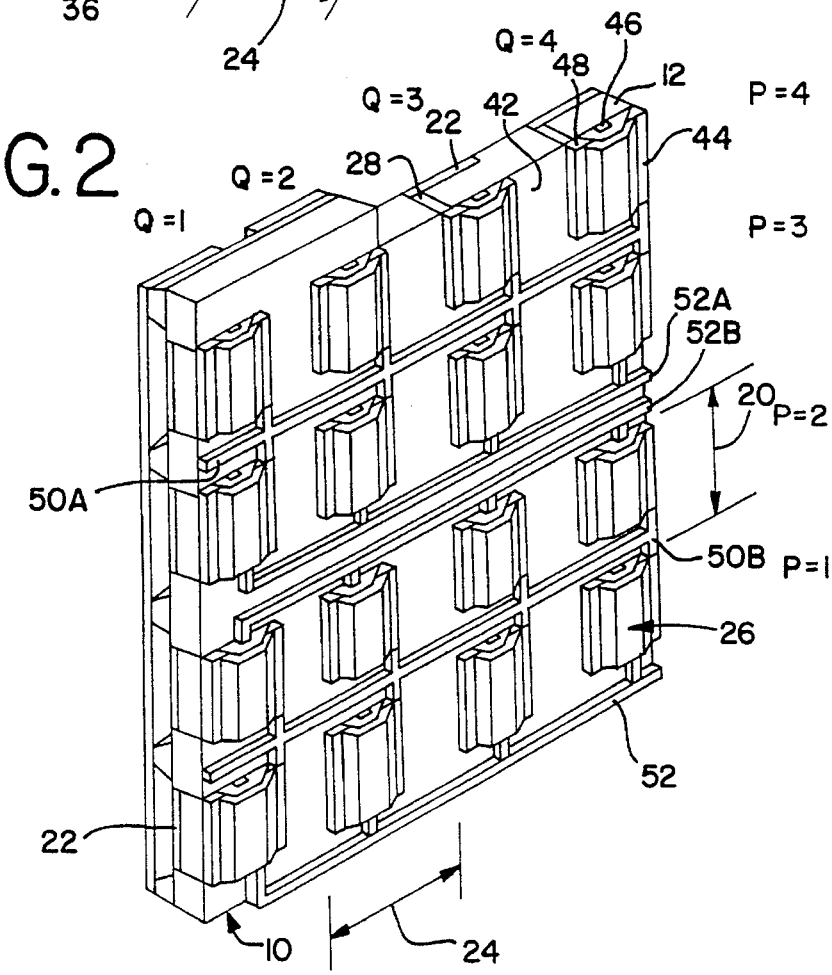

FIG. 2 shows the second face perspective of array 10. Array 10 contains substrate 12. Substrate 12 contains a second major face 42. Affixed to second face 42 is a plurality of switching elements 26. Suitable switching elements could be thin film transistors. Elements 26 are drawn to depict thin film transistors. Such a structure could be a coplanar electrode structure. Suitable electrode configurations, materials and method of fabrication for thin film transistors are well understood by those knowledgeable in the state of the art, and no detailed description of such a transistor switch is necessary. Each element 26 is affixed by a suitable means to face 42. Suitable means to affix thin film switching elements to the second face of the substrate could include vacuum deposition techniques. Each element 26 includes a first switch terminal 44, a second switch terminal 46, and s third switch terminal 48. Terminal 44 could be a source electrode of a suitable field effect transistor, terminal 46 could be a gate electrode of a suitable field effect transistor, terminal 48 could be a drain electrode of a suitable field effect transistor.

Each third terminal 48 in array 10 is electrically connected to a respective electrode 22 by a feedthrough 28. Suitable techniques for fabrication feedthroughs are provided in the references cited herein. Each electrode 22 overlaps the respective switch 26. Having each element 26 electrically connected and overlapped by the respective first electrode 22 yields an array of switching elements 26 arranged in a matrix of p rows and q columns. Each switch element 26 is identified by the same technique utilized for identifying respective first electrodes 22. Adjacent elements 26 in a respective row p are displaced by second period 24. Adjacent elements 26 in a respective column q are displaced by first period 20. Every first terminal 44 in each row p is electrically connected to a first buss 50. Each buss 50 is electrically connected to a common potential source. The common potential source and the electrical connection to the common potential source are not shown. Ground potential could be a suitable common potential source. A ground plane affixed to the second face could be electrically connected to each first buss. Every second terminal 46 in each row p is electrically connected to a respective second buss 52. Every buss 52 is parallel to every buss 50. The respective second buss for row p=4 is not shown for clarity. Every buss 50 is parallel to period 24. Having each second buss parallel to every first buss avoids electrical crossover networks when fabricating the active switch matrix. As well understood by those knowledgeable in the state of the art, avoiding electrical crossover networks in the active switch matrix enhances reliability of the switch matrix. In addition, extra fabrication steps are avoided, reducing device complexity. Additional benefits of active matrix addressing include a charge storage mechanism associated with each pixel, thereby enhancing luminous efficiency of my invention. In addition, the addressing scheme of my invention is conveniently integrated with large format devices containing large pixel counts. Furthermore, row at a time addressing could enhance frame rate capabilities. The set of busses containing every first buss is a suitable means to electrically connect every first switch terminal in each row to a common potential source. The set of busses containing each second buss is a suitable means to electrically connect every second switch terminal in a respective row by a suitable means.

The substrate of my invention could be an electrically insulating substrate. Such a substrate could be a machinable glass. Such a glass could be photomachinable and could be Fotoceram. Fotoceram is a trademark of Corning Inc., Corning, N.Y.

Ridges could be etched in a substrate by a variety of techniques. Ridges form a suitable support means to affix each column conductor to the first face of the substrate. The support means further includes separating the column conductors from respective first electrodes, assisting in the formation of the membrane capacitive pixel elements. Utilization of flexible (deformable), reflective conductors in my invention, avoids the use of a redundant set of conductors affixed to "walls" of a second substrate in the device, as would be the case with prior art 3hen that art is interfaced to surface deformation type light modulators. By eliminating the extraneous substrate, and redundant conductors affixed to "walls" of that substrate, gaps are also eliminated. As previously identified, eliminating gaps in my invention enhances modulation efficiency.

As well understood by those knowledgeable in the state of the art, several suitable column conductor support means exists. Support means could include the use of "pillars" as described in U.S. Pat. No. 3,746,785 to Goodrich. Suitable column conductor configurations for use with membrane light modulators could include discrete column conductors or could include separate column conductors deposited on a monolithic nonconductive membrane. Suitable materials, constructional methods and affixing means for a variety of column conductor configurations are provide in U.S. Pat. No. 4,087,810, to Hung et al, May 2, 1978, and references provided herein. Additional support means could include configurations described in the article, "A Membrane Page Composer" by L. S. Cosentino and W. C. Stewart, RCA Review Vol. 34, March 1973 and the geometry associated with U.S. Pat. No. 3,796,480 to Preston et al, Mar. 12, 1974. Recessing and embedding electrodes in the substrate at a depth below the first face represents an alternative suitable means to affix first electrodes to the substrate. Dimensions and potential differences suitable for use with membrane light modulators are provided in the references cited herein.

The active switch matrix of my invention allows a great deal of flexibility in the construction of surface deformation type modulators. Device testing could occur prior to integrating a suitable potential control means with array 10. This is an important consideration for membrane modulators since this could reduce the impact of contamination. Testing could occur after affixing an active switch matrix and the column conductors to the substrate. Upon successful completion of early stage testing, the membrane could be sealed by a protective housing and system integration continued by interfacing the array to a suitable potential control means. Several alternatives exist for interfacing the array to a suitable potential control means.

Figure 3:
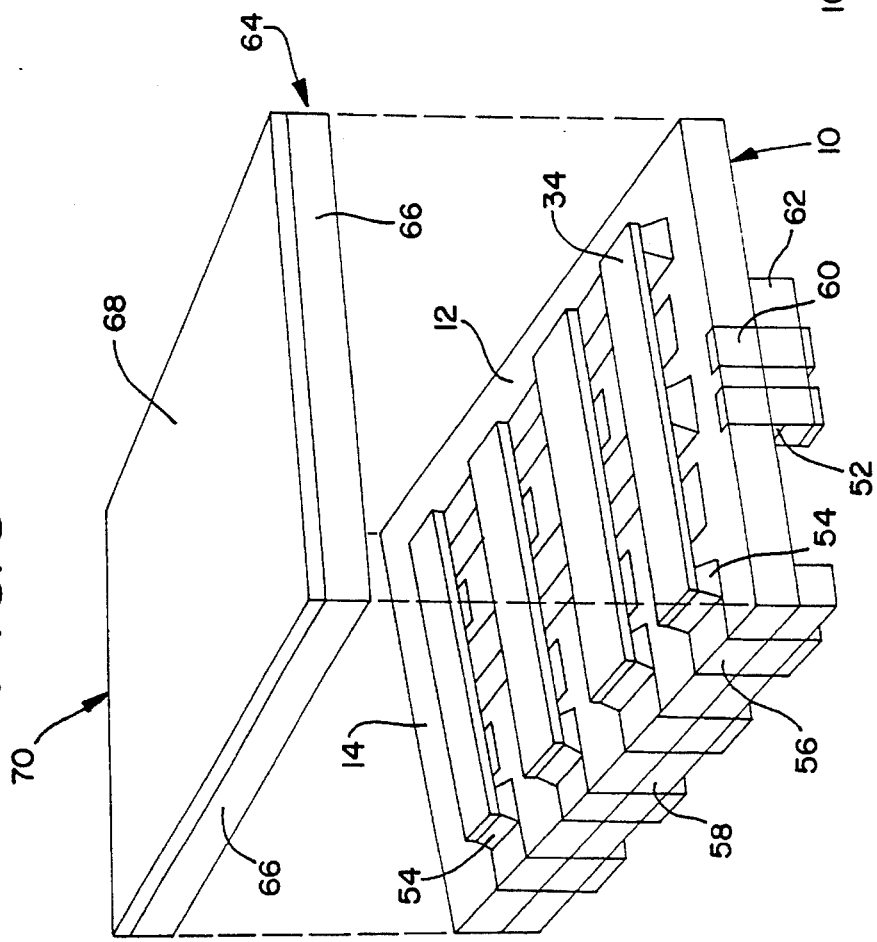

FIG. 3 shows a method of electrically interfacing and protecting a membrane modulator. Array 10 includes a segmented conducting ridge 54. Each column conductor 34 is affixed by a suitable means to a respective segment of segmented ridge 54. A plurality of electrical interconnects 56 are electrically connected to a respective segment of segmented ridge 54. Interconnects 56 are folded over a first standoff 58. Standoff 58 is affixed to substrate 12. Each second buss 52 is electrically connected to a respective interconnect pad 60. Pads 60 are folded over a second standoff 62. Standoff 62 is affixed to substrate 12. First standoff 58 and second standoff 62 recess switching elements affixed to the second face of the substrate and are a suitable means to avoid mechanical interference. Interconnect pads for use with the first busses are not shown in the figure. Interconnects 56 and pads 60 are a suitable means to electrically connect to the column conductors and the second busses respectively. Similar interconnect means could be utilized to electrically connect to each first buss. Interconnects 56 and pads 60 form a convenient interface for testing at early fabrication stages. Upon successful testing of array 10, a protective housing 64 is utilized to encase column conductors 34. Housing 64 contains four side walls 66 and a transmissive window 68. Each side wall 66 is affixed to major face 14 to encase column conductors 34 whereby conductors 34 could be sealed from contamination. Interconnects 56 are recessed in substrate 12 to assist in the sealing operation. A vacuum value could be provided for purge and fill operations if desired. Filling could be utilized to influence damping characteristics of the conductors. An electro-optical circuit module 70 contains interconnects 56, pads 60, housing 64, standoff 58, standoff 62, pads for interconnect to the first busses, and array 10. Methods of interconnecting module 70 to a mother board that contains suitable potential control circuitry could include insertion into a socket or bonding of interconnects and pads. Several bonding techniques exist and could include the process described in the article "LED Array Modules by New Technology Microbump Bonding Method" by Kenzo Hatada et al, IEEE Transactions on Components, Hybrids, and Manufacturing Technology, Vol. 13, No. 3, September 1990.

Module 70 is a suitable packaging means to protect array 10 from contamination. As well understood by those knowledgeable in the state of the art, several packaging means could be utilized.

As previously mentioned, several means exist to interface array 10 to a suitable potential control means. Alternatives to packaging the array as a circuit module include having the array substrate serve as a circuit substrate. One advantage of utilizing insulating substrate materials is the availability of substrates with large dimensions. This could allow for construction of large format devices. Availability of large substrate dimensions could allow latitude when considering how interface circuits to be utilized as the suitable potential control means are to be integrated to the modulator array. Substrate dimensions could be extended so as to accommodate interface circuit components utilized to control the potential difference of each pixel element. A wide variety of circuit components could be affixed to a large substrate to perform interface functions. High speed GaAs shift registers with compatible output interface circuits could be employed as a custom hybrid circuits and affixed to the substrate. Custom interface circuits could be bonded to the substrate utilizing procedures cited in the references herein. The substrate selection of my invention allows freedom in selecting circuit components for use with membrane modulators; this could allow for high speed data transfers, enhancing the capability of large format devices to achieve performance capabilities intrinsic to the membrane elements. Alternatively, the shift register could be a digital shift register of an appropriate number of bits to be compatible with a desired grey scale operation. Circuits interconnects could be constructed directly on the substrate. Metalized interconnects could enhance performance capabilities achieved with membrane modulators. Surface area for interface circuits should not be considered a limiting factor in my invention. In contradistinction to semiconductor substrates, insulating substrates with large dimensions, such as glass or ceramic substrates, are readily available.

Furthermore, the substrate selection of my invention, and the use of electronic circuit components affixed to the second face of the substrate could allow for rigorous cleaning operations prior to affixing conductors to the first face of the substrate. Such considerations are important in reducing the influence of contamination and establishing significant commercial viability of membrane modulators. Procedures similar to cleaning glass substrates for use with metal on glass master printing plates could be utilized with my invention. Such procedures are identified in the book "Thin-Film and Semiconductor Integrated Circuitry" by Doyle, chapter 2, "Photolithographic Masks". Due to the variety of processing options available to fabricate my invention, membranes may be affixed to a substrate and protected prior to affixing an active switch matrix to the second face. Testing of the membrane could occur prior to affixing the active switch matrix. First electrodes could be excited by test equipment connects to the feedthroughs to exercise the membrane; furthermore, several inspection techniques exist to check for contamination on the membrane. The membrane could be sealed at this point, and the active switch matrix affixed to the second surface. This latitude is available due to the nature of my invention. Relatively low temperature operations could be utilized to affix the active switch matrix to the second face of the substrate, without adversely effecting the membrane. The options available in the fabrication sequence of my invention could enhance commercial viability. Alternatively, the active switch matrix may be affixed to the second face prior to affixing the membrane to the substrate. The flexibility and amenability inherent in my invention is essential to enhancing commercial viability of membrane modulators. Such degrees of freedom have not existed in previous active matrix addressed membrane light modulators, due in part to the selection of a semiconductor substrate, and the fabrication sequences associated with those devices. As cited in the references provided herein, previous membrane light modulators have not achieved significant commercial viability.

A suitable potential control means to control the potential difference between each first electrode and the respective column conductor could involve synchronizing the potential applied to each column conductor with the activation of a particular row of switching elements from a high impedance state to a low impedance state. This would allow each pixel element formed by a first electrode in the activated row and the respective column conductor to charge to the potential difference which exists between the common potential source and the potential existing on the respective column conductor. After a sufficient charging duration, which is compatible with the line time requirements associated with the pixel format, frame rate and current handling capability of the switching element, the selected row of first electrodes would be switched from a low impedance state to a high impedance state. This sequence of events could be repeated for each row of pixel elements. Rows of pixel elements could be addressed by a consecutive sequence or a random select sequence. Suitable potential control means and circuitry are well understood by those knowledgeable in the state of the art.

Figure 4:
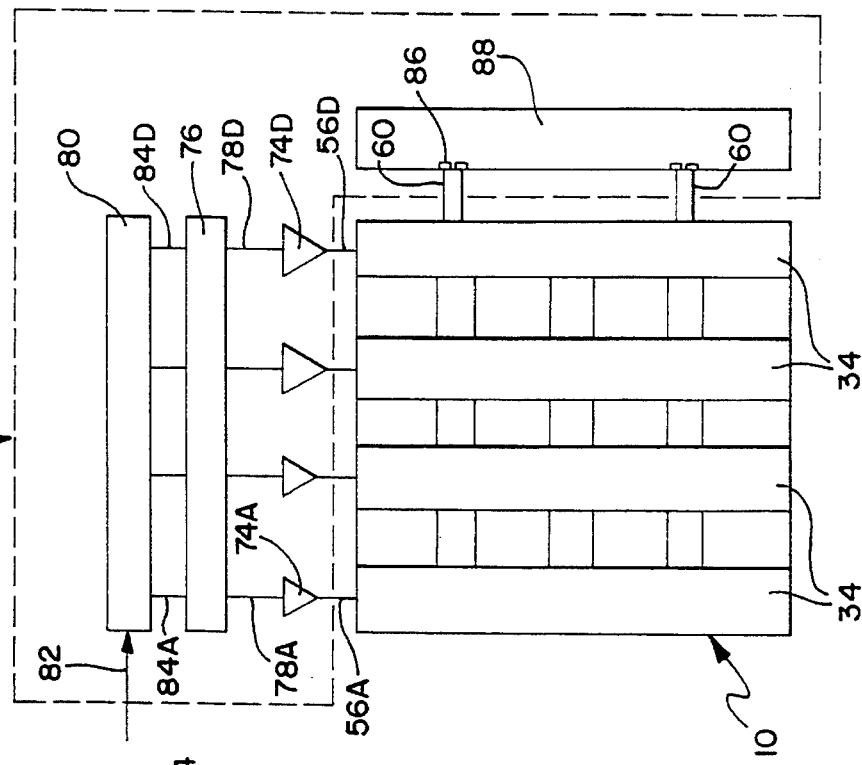

FIG. 4 shows a functional block diagram for interface circuitry which could be utilized as a suitable potential control means 72 to control the potential difference of each pixel element 40 in an array 10. Array 10 contains a plurality of column conductors 34. Suitable potential control means 72 includes a plurality of video column driver circuits 74. Each column conductor 34 of array 10 is electriclly connected to a respective video column driver circuit 74 by a suitable electrical interconnect 56. Driver circuits 74 are shown in a functional form. Since driver circuits 74 are not disposed under the first electrodes, and large substrate dimensions or suitable module interconnects are available with my invention, consequently, construction of drive circuits 74 does not hinder spatial resolution or adversely influence array 10. Furthermore, acceptable drive circuitry is well understood by those knowledgeable in the state of the art. As such, drive circuits 74 are not shown in detail. Suitable potential control means 72 further includes a parallel transfer block 76. Each circuit 74 is electrically connected by a suitable command input interconnect 78 to a respective transfer element contained in block 76. Individual transfer elements are well understood by those knowledgeable in the state of the art and are not shown in the figure. Suitable potential control means 72 further includes a shift register block 80. Shift register block 80 receives a serial video signal 82. Each stage of block 80 is electrically connected to a respective transfer element by a transfer interconnect 84. Shift register stages are well understood by those knowledgeable in the state of the art and are not shown in detail. Each second buss is electrically connected to a respective decoder terminal 86 of a row decoder block 88 by a respective pad 60. Requirements and circuitry for block 88 are well understood by those knowledgeable in the state of the art and not shown. Since the switching matrix is affixed to the second face of the substrate, no extraneous components for light shielding are required. Furthermore, use of backside electronic components allows for rigorous cleaning operations prior to affixing conductors to the first face of the substrate, reducing the influence of contamination. Having the option to implement rigorous cleaning operations with my invention could result in a high yield when fabricating membrane modulators. Consequently, it could be possible for suitable interface circuitry to be deposited on the periphery of the substrate without adversely effecting yield or commercial viability. This could allow for additional fabrication sequences to be implemented with my invention. Details of synchronizing row decode circuitry with column drive voltage are well understood by those knowledgeable in the state of the art, and are not shown.

SUMMARY, RAMIFICATIONS, AND SCOPE

Accordingly, the reader will see that the active switch matrix of my invention provides several advantages. My invention eliminates electrical crossovers in the switching matrix enhancing reliability, reducing fabrication steps to construct a membrane array. The functionality of column electrodes are enhanced by having the column electrodes participate in the addressing mechanism and enhancing modulation efficiency over prior art. Backside electronic addressing circuitry facilitates cleaning operations, to reduce the influence of contamination when affixing conductors to the first face of the substrate. Backside electronic circuitry increases functionally of the substrate by eliminating the need for extraneous light blocking components, and allows for testing at early stages of fabrication. My invention allows for variations in the fabrication sequence so as to permit implementation of procedures to reduce the influence of contamination. Prior art involving active matrix addressing of membrane modulators utilized semiconductor substrates where such freedom is reduced, or failed to simplify the active switch matrix to enhance reliability or convenience in fabrication, inhibiting significant commercialization.

Alternatives to standoffs to avoid mechanical interference with backside electronics could include utilizing the thickness of first and second busses to recess switching components. Furthermore, a protective housing similar to what is utilized to encase the conductors could be utilized to encase the switch matrix. Several alternative packaging concepts exist and are well understood by those knowledgeable in the state of the art.

Although the description above contains many specificities, these should not be construed as limiting the scope of the invention but merely providing illustrations of some of the presently preferred embodiments of this invention. For instance, as well understood by those knowledgeable in the state of the art, several switching type elements exist. See for instance U.S. Pat. No. 4,731,610 to Baron et al, Mar. 15, 1988. In addition, new transistor structures are being developed to serve a variety of applications. See for instance information in the article "Present and Future Applications of Amorphous Silicon and It's Alloys" by P. G. Comber, Journal of Non-Crystalline Solids 115(1989) 1–13. Utilizing the information contained herein, several suitable switching elements may be utilized to realize the advantages of my invention.

Due to the flexibility of interfacing to my invention, negative potentials as well as positive potentials relative to the common potential source could be conveniently established on the column conductors.

Several suitable means could be utilized to affix switching elements to the second face. Means selected could depend upon the dimensions desired for the first period and the second period. Several techniques exist to reduce the dimensions associated with feedthroughs in insulating substrates. See for instance "Glasses and Glass-Ceramics for Applications in Micromechanics" by D. Hulsenberg and R. Bruntsch, Journal of Non-Crystalline Solids 129 (1991) 199–205. Additional techniques to influence the first and second period dimension could involve the use of an oxide layer affixed to the second face. Switching elements would then be affixed to the exposed surface of the oxide layer. Suitable oxide layers could include phosphosilicate glass or silicon dioxide. The oxide layer could be etched to establish feedthroughs to electrically connect to the feedthroughs existing in the array substrate. Use of an oxide layer could allow finer dimensions to be achieved with feedthroughs etched in the oxide layer as compared to the array substrate. This could allow the switching elements to overlap respective feedthroughs in the array substrate with out shorting the switching element. This technique could enhance spatial resolution.

Several active switch matrix configurations could be utilized with my invention. Since affixing a thin film active switch matrix to the backside (second face of the substrate) provides several advantages over prior art, as cited herein, any active switch matrix configuration, including those which include crossovers, could be utilized and still provide several advantages over prior art. The only requirement is to have a suitable first buss means to electrically connect every first switch terminal to a common potential source and to electrically connect every second terminal in each row by a respective second buss. Although a no crossover matrix configuration provides additional advantages, it does not infer that a matrix configuration with crossovers is precluded from my invention. This is important because it is believed that no thin film active matrix configuration has ever been proposed for use with a membrane modulator array. As identified herein, several advantages could result from such an addressing configuration. Matrix configurations which posses crossovers are well understood by those knowledgeable in the state of the art. Accordingly, the scope of my invention should be determined not by the embodiments illustrated, but by the appended claims and their legal equivalents.

I claim:

1. An enhanced surface deformation light modulator for use in phase modulating an electromagnetic wavefront incident thereon in electronic to optical data conversion applications comprising:

an insulating substrate, a plurality of first electrodes arranged into a matrix of p rows and q columns, each said first electrode is affixed to said substrate by a suitable means, each column q of said first electrodes is overlapped by a respective reflective deformable column conductor, each said conductor is affixed to said substrate by a suitable conductor affixing means in such manner to electrically isolate the conductors from one another, a plurality of thin film transistors, each said transistor further includes a drain electrode, a gate electrode, and a source electrode, each said first electrode is electrically connected by a suitable electrical interconnect means to a respective thin film transistor, each said transistor is affixed by a suitable transistor affixing means to said substrate, the gate electrodes of said transistors which are electrically connected to said first electrodes in each row p are electrically connected by a respective row select buss, each said respective row select buss is affixed to said substrate by a suitable row buss means, a plurality of common busses electrically connecting the source electrodes of said transistors to a common potential source, each said common buss is affixed to said substrate by a suitable common buss means, each said common buss is essentially parallel to every said respective row select buss, a suitable potential control means to control an applied potential difference between each said first electrode and the respective conductor in accordance with an information bearing signal so as to enhance reliability, efficiency and commercial viability of the modulator.

2. The device of claim 1 wherein said substrate further includes a first major surface and a second major surface, said first major surface and said second major surface are opposing surfaces, each said conductor is affixed to said first major surface by said suitable conductor affixing means, each said respective row select buss is affixed to said substrate by a suitable row buss means, each said common buss is affixed to said substrate by a suitable common buss means.

3. The device of claim 2 wherein each said transistor is affixed to said second major surface by said suitable transistor affixing means, each said respective row select buss is affixed to said second major surface by said suitable row buss means, each said common buss is affixed to said second major surface by said suitable common buss means, each said first electrode overlaps said respective thin film transistor.

4. An enhanced membrane light modulator for use in phase modulating an electromagnetic wavefront incident thereon in electronic to optical data conversion applications comprising:

an insulating substrate, a plurality of first electrodes arranged into a matrix of p rows and q columns, each said first electrode is affixed to said substrate by a suitable means, each column q of said first electrodes is overlapped by a respective deformable column conductor, each said conductor is affixed to said substrate by a suitable conductor affixing means in such manner to electrically isolate the conductors from one another, a plurality of thin film transistors, each said transistor further includes a drain electrode, a gate electrode and a source electrode, each said first electrode is electrically connected by a suitable electrical interconnect means to a respective thin film transistor, each said transistor is affixed by a suitable transistor affixing means to said substrate, the gate electrodes of said transistors which are electrically connected to said first electrodes in each row p are electrically connected by a respective row select buss, each said respective row select buss is affixed to said substrate by a suitable row buss means, a plurality of common busses electrically connecting the source electrodes of said transistors to a common potential source, each said common buss is affixed to said substrate by a suitable common bus means, each said common buss is essentially parallel to every said respective row select buss, a suitable potential control means to apply between each said first electrode and the respective conductor a respective potential difference, whereby varying each said respective potential difference varies the deformation of said respective conductor overlapping the first electrode thereby phase modulating said wavefront incident thereon affectively, efficiently and reliably thereby enhancing commercial viability of said modulator.

5. An enhanced membrane light modulator for use in phase modulating an electromagnetic wavefront incident thereon comprising:

an insulating substrate, said substrate further includes a first major surface and a second major surface, said first major surface and said second major surface are opposing surfaces, a plurality of first electrodes arranged into a matrix of p rows and q columns, each said first electrode is affixed by a suitable means to said substrate, each column q of said first electrodes is overlapped by a respective reflective deformable column conductor, each said conductor is affixed by a suitable means to said first major surface in such manner to electrically isolate the conductors from one another, a plurality of thin film transistors, each said transistor further includes a drain electrode, a gate electrode, and a source electrode, each said first electrode is electrically connected by a suitable feedthrough means to a respective thin film transistor, each said transistor is affixed by a suitable means to said second major surface, the gate electrodes of said transistors which are electrically connected to said first electrodes in each row p are electrically connected by a respective row select buss, each said respective row select buss is affixed by a suitable means to said second major surface, a plurality of common busses electrically connecting the source electrodes of said transistors to a common potential source, each said common buss is affixed to said second major surface by a suitable means, each said common buss is essentially parallel to every said respective row select buss thereby avoiding electrical crossover networks, a suitable potential control means to control an applied potential difference between each said first electrode and the respective conductor in accordance with an information bearing signal so as to enhance reliability, efficiency and commercial viability of the modulator.

* * * * *